United States Patent [19]
Miller

[11] 3,809,165
[45] May 7, 1974

[54] HYDRAULICALLY OPERATED WEIGHT CONTROL

[76] Inventor: Maurice E. Miller, Stratton, Nebr. 69043

[22] Filed: Feb. 26, 1973

[21] Appl. No.: 335,444

[52] U.S. Cl. ............... 172/328, 172/413, 172/678
[51] Int. Cl. ........................................... A01b 59/04
[58] Field of Search .......... 172/413, 328, 678, 583, 172/677–680, 324

[56] References Cited
UNITED STATES PATENTS

| | | | |
|---|---|---|---|
| 3,604,378 | 9/1971 | McDaniel, Jr. | 111/85 |
| 2,967,574 | 1/1961 | Morkoski | 172/328 |
| 3,082,830 | 3/1963 | McKay | 172/328 |
| 3,204,984 | 9/1965 | Walberg | 172/678 X |

*Primary Examiner*—Stephen C. Pellegrino
*Attorney, Agent, or Firm*—Zarley, McKee & Thomte

[57] ABSTRACT

A hydraulically operated weight control apparatus for a disc or the like is disclosed comprising means for shifting the weight between front and rear disc sections. The disc comprises a frame means having front and rear disc sections secured thereto. A transversely extending axle is secured to the frame means and has ground engaging wheels at the opposite ends thereof which control the discing depth and transport height. A hydraulic cylinder is secured to the axle to raise and lower the wheels with respect to the frame means. A forwardly extending hitch is pivotally secured about a horizontal axis to the forward end of the frame means. A hydraulic cylinder is connected to the axle and the hitch means to pivot the hitch means with respect to the frame means to permit the selective shifting of weight between the front and rear disc sections.

6 Claims, 4 Drawing Figures

PATENTED MAY 7 1974　　　　　　　　　　　　　3,809,165

HYDRAULICALLY OPERATED WEIGHT CONTROL

BACKGROUND OF THE INVENTION

Tractor drawn discs tend to slide or drift sidewardly when the disc is being drawn along the slope of a hillside. This is especially true in those discs having front and rear disc sections which are disposed in an opposing angular relationship with respect to each other.

Therefore, it is a principal object of the invention to provide a hydraulically operated weight control apparatus.

A further object of the invention is to provide a hydraulically operated weight control apparatus for a disc or the like.

A further object of the invention is to provide a weight control apparatus for a disc which is connected to the wheel axle so that the disc will remain level both in the ground and in transporting position.

A further object of the invention is to provide a weight control apparatus for a disc or the like which permits the selective shifting of weight between the front and rear disc sections to offset the directional side-thrust created by a hillside or the like.

A further object of the invention is to provide a weight control apparatus for a disc or the like which may be controlled from the tractor.

A further object of the invention is to provide a weight control apparatus for a disc or the like which causes the weight of the machine to shift between the front and back disc sections with the wheel area being the primary balance point.

A further object of the invention is to provide a hydraulically operated weight control apparatus which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
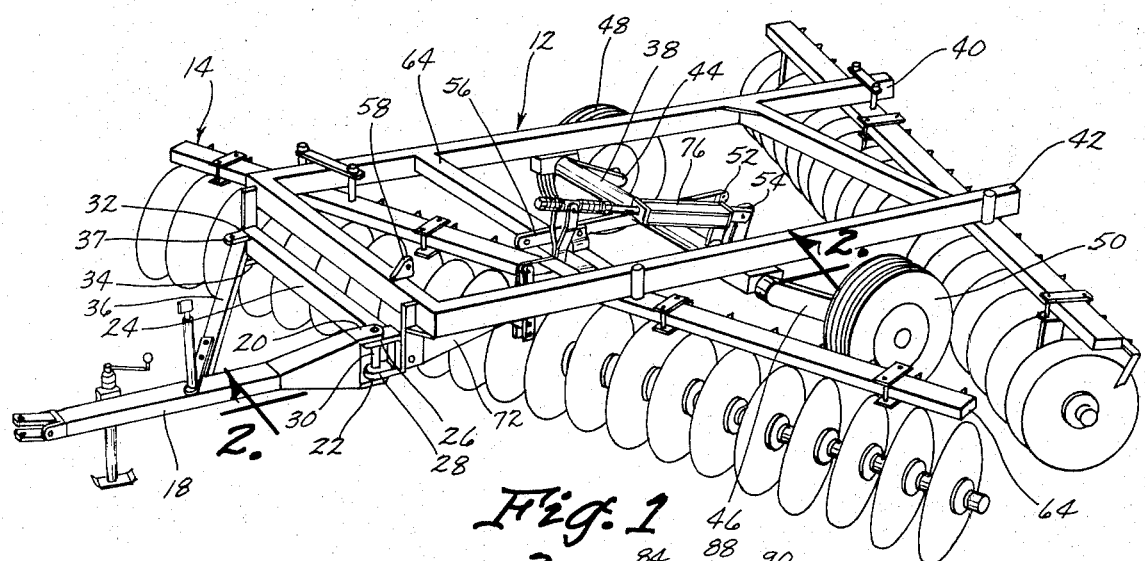
FIG. 1 is a front perspective view of a disc having the weight control apparatus mounted thereon.

The numeral 10 refers generally to a disc comprising generally a frame means 12 having front and rear disc sections 14 and 16 secured thereto in an opposing manner as illustrated in FIG. 1. A hitch means 18 is provided at the forward end of the disc and has a pair of spaced apart ears 20 and 22 provided thereon at its rearward end. The numeral 24 refers to a square tubular frame member which is pivoted at its opposite ends about a horizontal axis to the forward end of frame means 12. Frame member 24 has a pair of spaced apart ears 26 and 28 extending forwardly from one end thereof which are pivotally connected to the ears 20 and 22 by bolt 30. Likewise, a pair of spaced apart ears 32 and 34 are secured to the other end of the frame member 24 and have a brace 36 pivotally secured thereto by a suitable bolt 37. The forward end of brace 36 is connected to the hitch means 18 intermediate the ends thereof as seen in FIG. 1.

A tubular housing 38 is secured to and extends between frame members 40 and 42 of frame means 12 and has an axle rotatably mounted therein. A pair of downwardly extending arms 44 and 46 are secured to the opposite ends of the axle and have wheels 48 and 50 operatively secured thereto respectively. A pair of upstanding post 52 and 54 are secured to the axle so that movement of the axle will cause movement of the posts 52 and 54 and vice versa. Bar 56 is pivotally secured at its rearward end to the upper end of post 52 and would have a hydraulic cylinder (not shown) secured thereto to cause the pivotal movement of the arms 44 and 46 with respect to the frame means so that the disc sections may be raised and lowered. The forward end of the hydraulic cylinder would be connected to the lug 58.

The numeral 60 refers to a linkage which is pivotally secured at 62 to the frame member 64 which extends between the frame members 40 and 42. The forward end of linkage 60 is pivotally connected at 66 to a pair of downwardly extending plates 68 and 70. The numeral 72 refers to a support which is secured at its forward end to one end of frame member 24 by welding or the like. The rearward end of support 72 is pivotally connected to the lower ends of plates 68 and 70 by a bolt 74.

Figure 2:
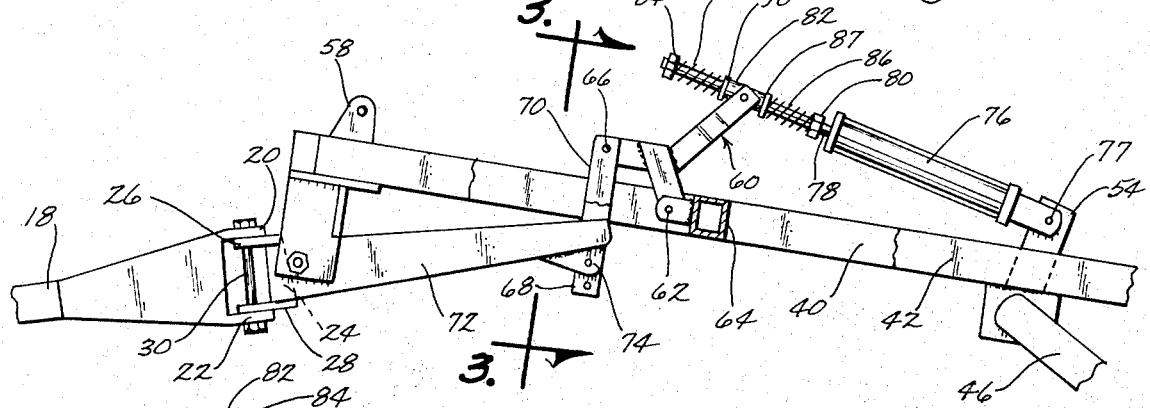
FIG. 2 is an enlarged sectional view seen along lines 2 — 2 of FIG. 1.
Figure 3:
FIG. 3 is a sectional view seen along lines 3 — 3 of FIG. 2.
Figure 4:
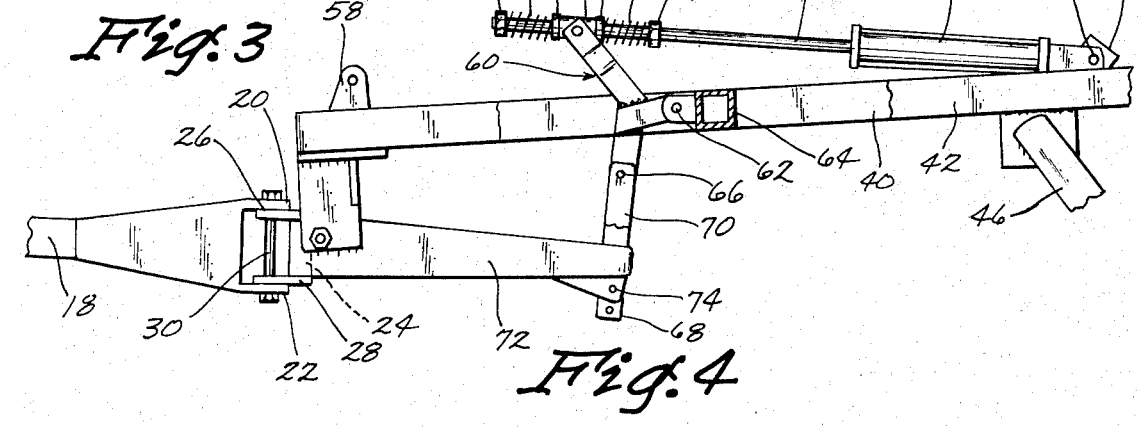
FIG. 4 is a sectional view similar to FIG. 2 except that the weight control apparatus is in a different position.

A hydraulic cylinder 76 is pivotally connected at one end to the upper end of post 54 by pin 77. Hydraulic cylinder 76 has an elongated cylinder rod 78 extending therefrom. Stop element 80 is secured to the rod 78 as seen in FIG. 2. Rod 78 extends through a collar 82 which is pivotally connected to the upper end of linkage 60. Nut 84 is provided on the forward end of the rod 78. A spring 86 embraces the rod 78 and is positioned between the stop element 80 and a washer 87 positioned adjacent the rearward end of the collar 82. Spring 88 embraces rod 78 between the nut 84 and the washer 90 positioned adjacent the forward end of the collar 82.

The hydraulic cylinder extending between the bar 56 and lug 58 is provided only to control discing depth and transport height. The hydraulic cylinder 76 is provided to permit the selective shifting of weight between the front and rear disc sections. Thus, retraction of the rod 78 into the cylinder 76 causes the linkage 60 to pivot in a clockwise manner with respect to 62 thereby causing the forward end of the hitch means 18 to be lowered. The lowering of the forward end of the hitch means 18 causes additional weight to be exerted on the rear disc section and less weight to be exerted on the front disc section. Conversely, extension of the rod 78 from the cylinder 76 causes the linkage 60 to pivot about 62 in a counterclockwise manner thereby causing the forward end of the hitch means 18 to move upwardly. The upward movement of the forward end of the hitch means causes additional weight to be exerted on the front disc section and less weight to be exerted on the rear disc section. Raising or lowering of the hitch as outlined above causes the weight of the machine to shift to the front or back section of the disc with the wheel area being the primary balance point. Putting the most weight on a given disc section on this type of machine allows that section to exert the most influence of its inherent side-thrust making the machine swing one way or the other or centered if the weight is balanced.

It is important to note that the hitch is connected to the wheel axle through the weight control distribution apparatus because of the machine's need to remain level both in the ground and in the transporting position. The apparatus disclosed herein makes the end of the hitch swing down when the wheels pivot downwardly and the hitch comes up when the wheels raise. The springs 86 and 88 permit relative movement between the cylinder rod 78 and the linkage 60 when the wheels are raised and lowered with respect to the frame means.

The tractor operator can remotely control the weight control apparatus from the tractor so that the proper amount of directional side-thrust can be applied to the front or rear disc sections so that the disc will fight gravity and hold the hillside. Thus, it can be seen that the apparatus of this invention accomplishes at least all of its stated objectives.

I claim:
1. A disc, comprising,
 a frame means having rearward and forward ends,
 at least front and rear disc sections secured to said frame means,
 a transversely extending axle means operatively secured to said frame means and having ground engaging wheels at the opposite ends thereof,
 a first hydraulic cylinder means operatively connected to and extending between said frame means and said axle means for raising and lowering said wheels with respect to said frame means,
 a forwardly extending hitch means operatively secured to said frame means at the forward end thereof, said hitch means being pivotally secured to said frame means about a horizontal axis,
 a second hydraulic cylinder means operatively connected to said axle means and said hitch means to pivot said hitch means with respect to said frame means to permit the selective shifting of weight between said disc sections.

2. The disc of claim 1 wherein said second hydraulic cylinder means has a cylinder rod extending therefrom and wherein a linkage means operatively interconnects said cylinder rod and said hitch means, said linkage means being pivotally secured to said frame means about a horizontal axis, said linkage means having a rearward end portion which is secured to said cylinder rod, said hitch means including a rearwardly extending support means, said linkage means having a forward end portion which is pivotally secured to the rearward end of said support means whereby movement of said cylinder rod will cause the pivotal movement of said hitch means with respect to said frame means to shift the weight between said disc sections.

3. The disc of claim 2 wherein said hitch means has a transversely extending frame member at its rearward end which is pivoted to said frame means about said horizontal axis, the forward end of said support means being rigidly secured to said frame member.

4. The disc of claim 2 wherein a collar means is slidably mounted on said cylinder rod, said rearward end portion of said linkage means being pivotally secured to said collar means, first and second stop elements secured to said cylinder rod in a spaced apart relationship on opposite sides of said collar means, a first spring means embracing said cylinder rod between said first stop element and said collar means, and a second spring means embracing said cylinder rod between said second stop element and said collar means.

5. The disc of claim 2 wherein said second hydraulic cylinder means is operatively connected to said axle means so that rotational movement of said axle means with respect to said frame means causes longitudinal movement of said second hydraulic cylinder means and pivotal movement of said hitch means.

6. The disc of claim 5 wherein an upstanding post is secured to said axle, said second hydraulic cylinder means being pivotally connected at its base end to said post.

* * * * *